US012623541B2

(12) United States Patent
Jin et al.

(10) Patent No.: US 12,623,541 B2
(45) Date of Patent: May 12, 2026

(54) DUAL AXIS ROTATIONAL MECHANISM

(71) Applicant: Tesla, Inc., Austin, TX (US)

(72) Inventors: Ding Jin, Newark, CA (US); Aneesh Kaliyanda, San Jose, CA (US); Harold Mejia Ruiz, Palo Alto, CA (US); Shakeel Theodore, Fremont, CA (US)

(73) Assignee: Tesla, Inc., Austin, TX (US)

( * ) Notice: Subject to any disclaimer, the term of this patent is extended or adjusted under 35 U.S.C. 154(b) by 348 days.

(21) Appl. No.: 18/560,084

(22) PCT Filed: May 16, 2022

(86) PCT No.: PCT/US2022/029466
§ 371 (c)(1),
(2) Date: Nov. 9, 2023

(87) PCT Pub. No.: WO2022/245741
PCT Pub. Date: Nov. 24, 2022

(65) Prior Publication Data
US 2024/0227558 A1 Jul. 11, 2024

Related U.S. Application Data

(60) Provisional application No. 63/201,884, filed on May 17, 2021.

(51) Int. Cl.
*B60K 35/53* (2024.01)
*B60K 35/22* (2024.01)
*B60K 35/50* (2024.01)

(52) U.S. Cl.
CPC .............. *B60K 35/53* (2024.01); *B60K 35/22* (2024.01); *B60K 35/50* (2024.01); *B60K 2360/688* (2024.01); *B60K 2360/816* (2024.01)

(58) Field of Classification Search
CPC .. B60K 35/50; B60K 35/53; B60K 2360/816; B60K 35/658; B60K 2360/822; B60K 2360/84; B60Y 2400/92
See application file for complete search history.

(56) References Cited

U.S. PATENT DOCUMENTS

| 2001/0013744 A1 | 8/2001 | Jakel |
| 2004/0144906 A1 | 7/2004 | Hill et al. |

(Continued)

FOREIGN PATENT DOCUMENTS

| CN | 109398247 | 3/2019 |
| CN | 117320913 | 12/2023 |

(Continued)

OTHER PUBLICATIONS

CN109398247 Translation dated Jan. 7, 2026.*

(Continued)

*Primary Examiner* — Paul N Dickson
(74) *Attorney, Agent, or Firm* — Schwegman Lundberg & Woessner, P.A.

(57) ABSTRACT

Generally described, one or more aspects of the present disclosure relate to the configuration and management of one or more components to facilitate dual axis rotation. More specifically, one or more aspects of the present application relate to the configuration or management of a rotation mechanism to facilitate the dual axis rotation of a display device. Illustratively, the display device is mounted on rotation mechanism that facilitates a dual axis rotation utilizing a single actuator, dual rotation joints, and associated linkages. The rotation component further includes at least one additional floating joint that provides additional tension forces relative to a third axis. Still further, in accordance with further embodiments, a control component can be utilized to generate control signals relating to rotation (Continued)

of the single actuators, such as establishing control positions and duty cycles.

16 Claims, 12 Drawing Sheets

(56) References Cited

U.S. PATENT DOCUMENTS

| | | | | |
|---|---|---|---|---|
| 2020/0208719 A1 | 7/2020 | Zanzinger | | |
| 2024/0140327 A1* | 5/2024 | Ahn | | B60K 35/00 |
| 2024/0188234 A1* | 6/2024 | Huang | | B60K 35/22 |
| 2025/0063674 A1* | 2/2025 | Yu | | H05K 5/0217 |
| 2025/0214439 A1* | 7/2025 | An | | B60K 35/53 |
| 2025/0276580 A1* | 9/2025 | Jagusch | | B60K 35/22 |
| 2025/0343461 A1* | 11/2025 | Lee | | B60K 35/50 |
| 2025/0346195 A1* | 11/2025 | Chen | | B60K 35/53 |

FOREIGN PATENT DOCUMENTS

| | | |
|---|---|---|
| EP | 4341122 | 3/2024 |
| KR | 20240009436 | 1/2024 |
| WO | 2022245741 | 11/2022 |

OTHER PUBLICATIONS

"International Application Serial No. PCT US2022 029466, International Preliminary Report on Patentability mailed Nov. 30, 2023", 9 pgs.

"European Application Serial No. 22732716.0, Response filed Jun. 11, 2024 to Communication pursuant to Rules 161(2) and 162 EPC mailed Jan. 3, 2024", 9 pgs.

International Search Report and Written Opinion for International Application No. PCT/US2022/029466, Notification mailed Sep. 8, 2022.

* cited by examiner

START ACTUATOR CONTROL ROUTINE

700

OBTAIN ACTUATOR ACTIVATION SIGNAL

702

EVALUATE OBTAINED INFORMATION ACCORDING TO DETERMINED LOOKUP TABLE

704

PROCESS OPERATIONAL PARAMETERS

706

TRANSMIT PROCESSED OPERATIONAL PARAMETERS

708

DUAL AXIS ROTATIONAL MECHANISM

CROSS-REFERENCE TO RELATED APPLICATION

This application claims the benefit of U.S. Provisional Application No. 63/201,884, entitled DUAL AXIS ROTATIONAL MECHANISM and filed on May 17, 2021. U.S. Provisional Application No. 63/201,884 is incorporated by reference herein.

BACKGROUND

Generally described, a variety of vehicles, such as electric vehicles, combustion engine vehicles, hybrid vehicles, etc., can be configured with various sensors and components to facilitate operation. For example, vehicles can be configured with various display devices that present information to occupants of the vehicle. The display devices may be embedded or integrated into a vehicle, such as integrated with at least a portion of the dashboard. Alternative, the display devices may be free standing or at least partially independent of other vehicle structures. During operation of the vehicle, the occupants may wish to adjust an orientation of the display devices, such as rotation along one or more axis. For example, a display device may be rotated with reference to an x-axis, a y-axis, or a z-axis.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Generally described, one or more aspects of the present disclosure relate to the configuration and management of one or more components to facilitate dual axis rotation. More specifically, one or more aspects of the present application relate to the configuration or management of a rotation mechanism to facilitate the dual axis rotation of a display device. Illustratively, the display device is mounted on rotation mechanism that facilitates a dual axis rotation utilizing a single actuator, dual rotation joints, and associated linkages. The rotation component further includes at least one additional floating joint that provides additional tension forces relative to a third axis. Still further, in accordance with further embodiments, a control component can be utilized to generate control signals relating to rotation of the single actuators, such as establishing control positions and duty cycles.

Figure 1A:
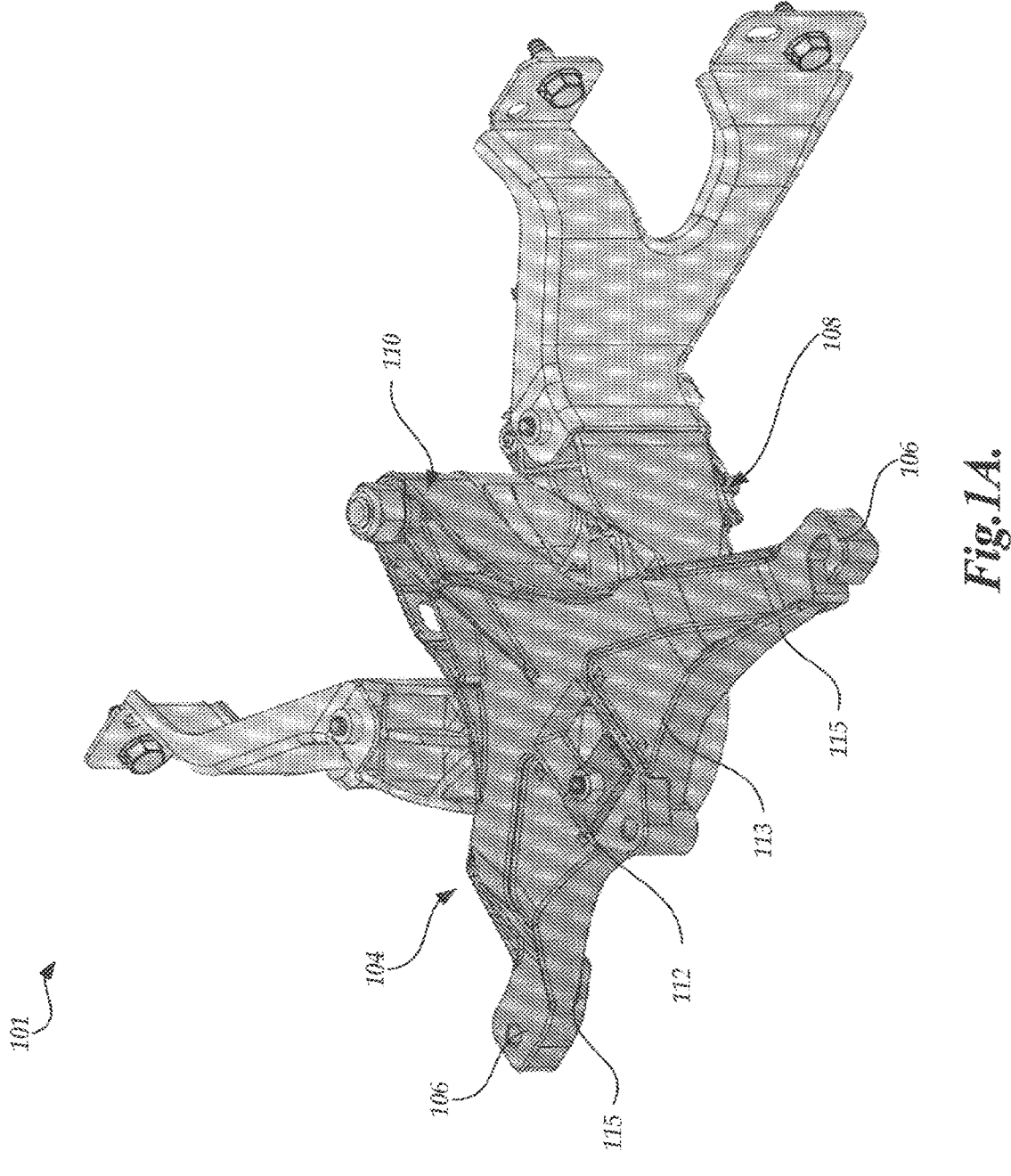
FIG. 1A is a perspective view of a linkage structure for using in rotational mechanism in accordance with one or more aspects of the present application.

Traditional approaches to automating rotation mechanisms are limited to have individual actuators control rotation relative to a single axis. For example, a rotation mechanism facilitating rotation along a single axis would utilize a single actuator that controls rotation along a single axis. In a more complex example, a traditional rotation mechanism facilitating rotation along two axes would utilize multiple actuators for each rotational axis (e.g., two actuators to control two axis of rotation). Such traditional approaches can be inefficient or complex in terms of the number of parts forming the rotation mechanism. Additionally, such traditional rotation mechanisms require some form of synchronization signals or components to coordinate the operation of the plurality of actuators. Illustratively, the mounting structure 113 is fixed to the first rotational joint In accordance with these embodiments and to address at least some of the deficiencies associated with traditional multi-component rotation mechanisms, one or more aspects of the present application include a rotation mechanism that includes single actuator that provides clockwise and counterclockwise rotation of the rotation mechanism defined about rotational axis. The rotation of the actuator can be defined in terms of control position relative to a specified angular position and the duty cycle defining an amount of time or actuator utilization to achieve the specified angular position. The rotation mechanism also includes a linkage structure that includes three rotation joints that result in a dual-axis pivot based on the single actuator FIG. 1A is a perspective view of a rotational mechanism 101 including a linkage structure 104 for using in rotational mechanism in accordance with one or more aspects of the present application. The linkage structure 104 includes a first rotational joint 108 and second rotational joint 110 that cooperate in rotation based on rotation from a single actuator (not shown). Illustratively, the first rotational joint 108 and second rotational joint 110 are physically connected via one or more arms 109 or links that allow for the translation of rotational forces applied to the first rotational joint 108 to be applied to the second rotational joint 110. As will be illustrated in greater detail below, responsive to rotational forces applied to the second rotational joint 110, the first rotational joint, the second rotational joint 110 will travel or rotate about a center axis 111 of the first rotational joint 108.

The linkage structure 104 further includes a mounting structure 113 that defines two or more anchor points 106 for mounting various components, such as a display component. As illustrated in FIG. 1A, the mounting structure 113 can include a plurality of arms 115 for containing the anchor points 106. Illustratively, the arms 115 are equidistant from a center axis defined along the mounting structure 113. Additionally, the mounting structure 113 may be fixed or adhered to the second rotational joint such that mounting structure 113 will rotate in accordance with the rotation of the second rotational joint 110. As illustrated below, the mounted component (e.g., display device) will be rotate in accordance with the mounting structure 113. The geometry of the mounting structure 113 can vary according to the dimensions of the component being mounted and the mounting requirements, such as the number of anchor points required based on dimensions, weight and forces being applied to the linkage structure 104 or mounted component.

The linkage structure 104 includes a third rotational joint 112 that does not directly rotate with the inputs from the single actuator but floats in a manner to provide forces in a third axis. Accordingly, the third rotational joint 112 may be referred to as a floating joint that travels along a linear axis in cooperation to control the rotation of the mounted components. Illustratively, the travel of the third rotational joint 112 or floating joint will be defined along a channel 117 defined within the mounting structure 113. The channel can include substantially horizontal surfaces and opposing diagonal surfaces that contact corresponding surfaces on the third rotational joint 112 in response to a tension force applied to the rotational joint, such as by a spring. In this regard, the floating joint aspect of the third rotational joint compensates for the different linear forces created by the cooperative rotation of the first and second rotational joints 108, 110. In some embodiments, the third rotational joint manages the movement of the mounting structure 113 (and mounted device), such as to keep the mounted device flush with other internal compartment portions of a vehicle, such a dashboard or console(s).

Figure 1B:
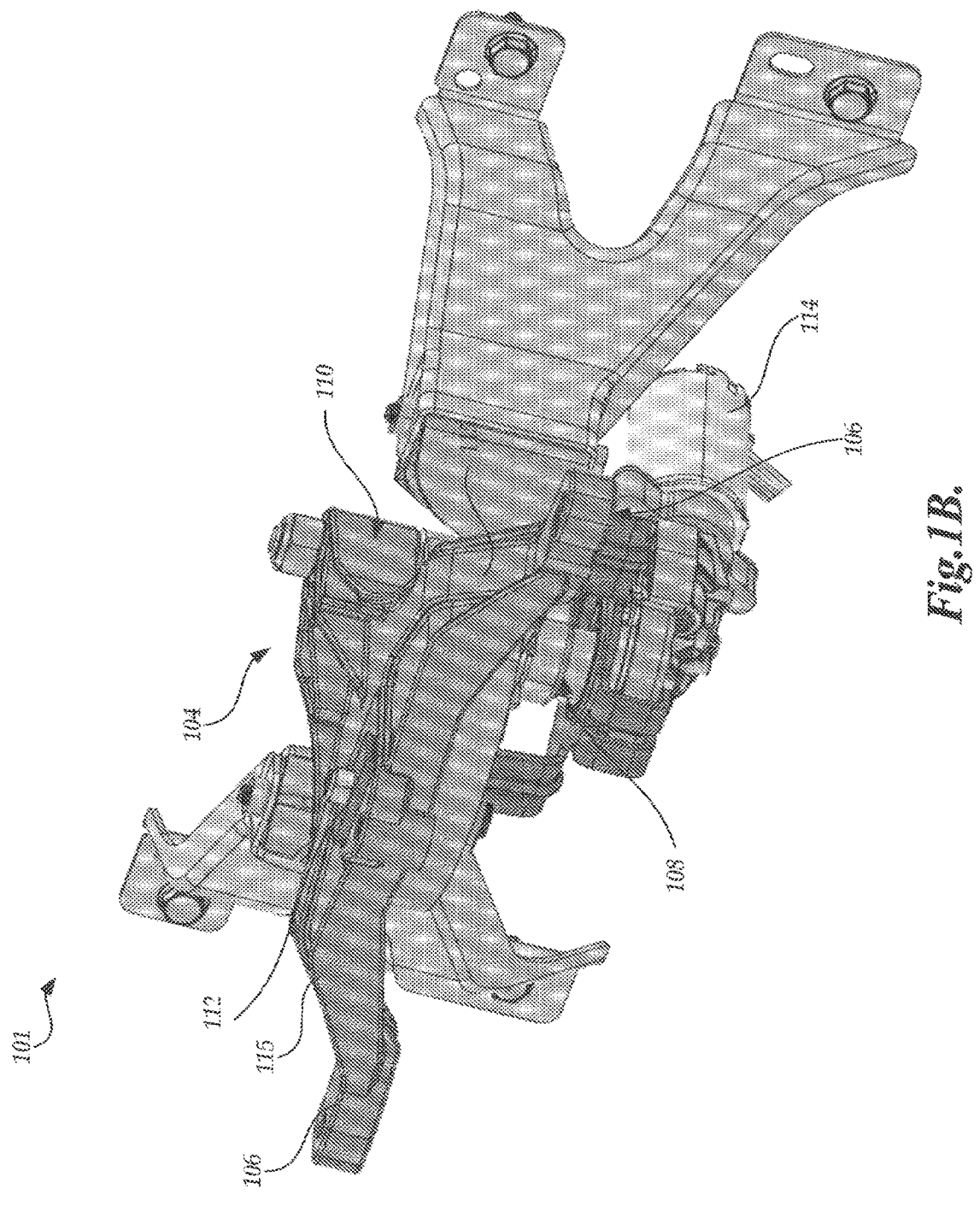
FIG. 1B is a perspective view of a linkage structure for using in rotational mechanism in accordance with one or more aspects of the present application.

FIG. 1B represents a different perspective view of a rotational mechanism 101 including a linkage structure relative to FIG. 1A. FIG. 1B illustrates the linkage structure 104, including the first rotational joint 108 and second rotational joint 110 that cooperate in rotation. Additionally, FIG. 1B illustrates a single actuator 114 that is connected to the first rotational joint 108 and provides rotational forces. FIG. 1B also illustrates the mounting structure 113 and plurality of anchor points 106 connected via arms 115 of the mounting structure.

Figure 2A:
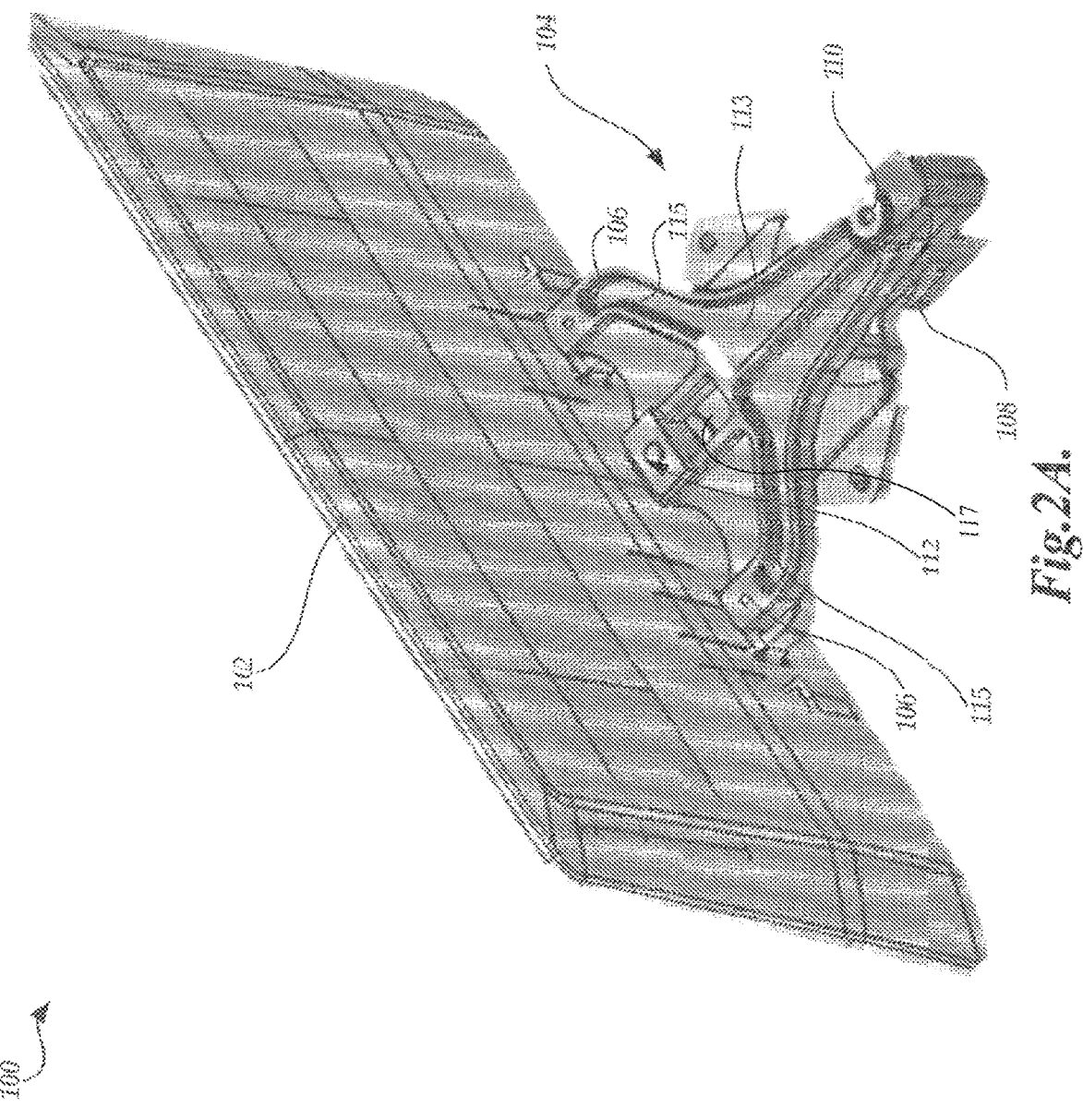
FIG. 2A is a perspective view of a set of components including a display device, rotational mechanism and linkage structure in accordance with one or more aspects of the present application.

FIG. 2A is a perspective view of an illustrative embodiment of the present application including a combination of components 100 including a display device 102, rotational mechanism 101 and linkage structure 104. The display device corresponds illustrative to a video display device, such as a display device 102 utilized in a vehicle to display information to one or more occupants. The display device 102 is mounted to a linkage structure 104 via two mounting points 106. Additionally, the mounting structure 113 can include additional surfaces (one or more) that contact the mounted device (e.g., the display device).

Figure 2B:
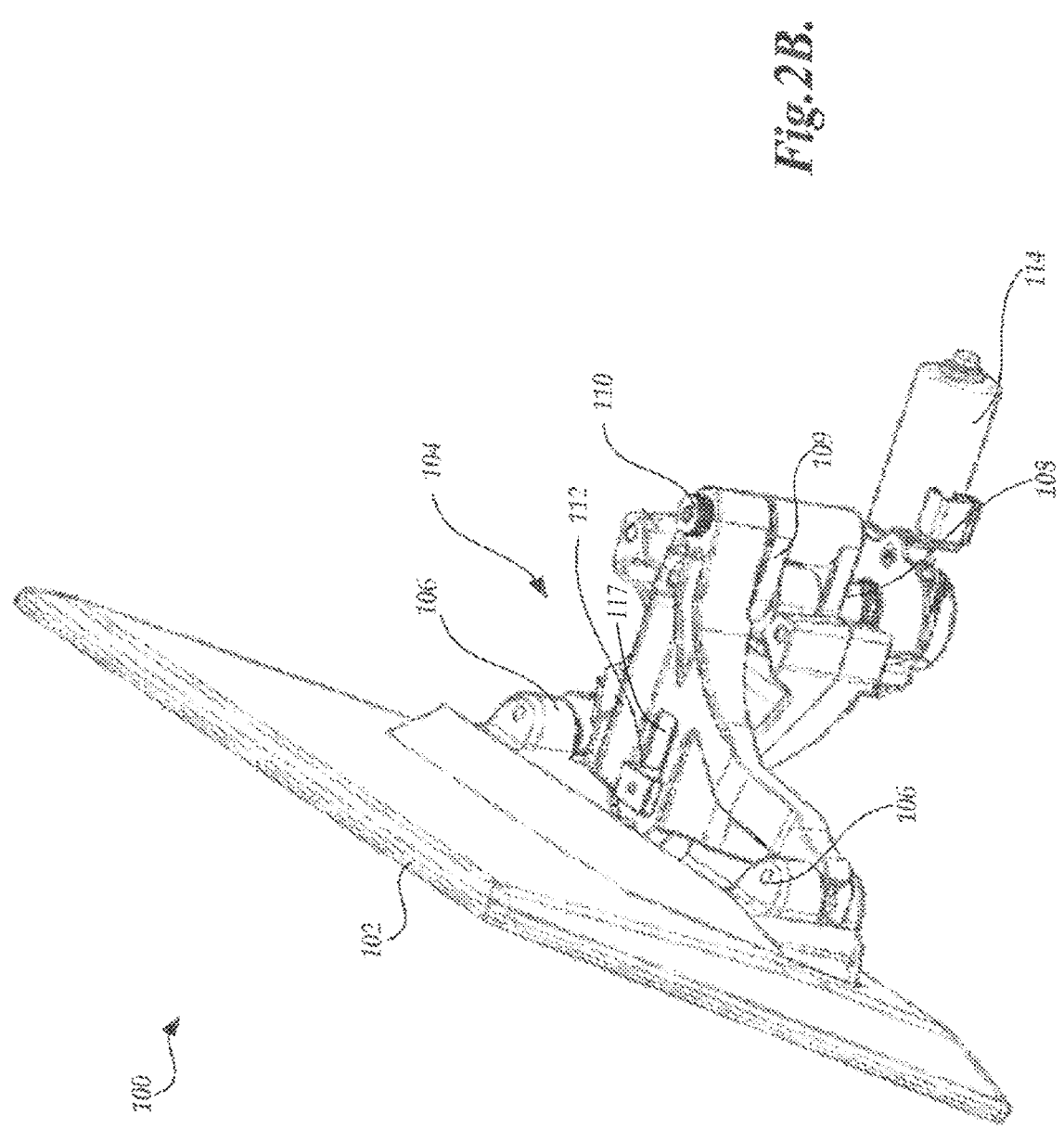
FIG. 2B is a perspective view of a set of components including a display device, rotational mechanism and linkage structure in accordance with one or more aspects of the present application.

FIG. 2B is a different perspective view of a combination components 100 including a display device 102, rotational mechanism 101 and linkage structure 104 in accordance with one or more aspects of the present application FIG. 2B illustrates the actuator 114.

Figure 3:
FIG. 3 is a perspective view of a set of components including a display device, rotational mechanism and linkage structure illustrating a first rotational state responsive to a rotational force in accordance with one or more aspects of the present application.
Figure 4:
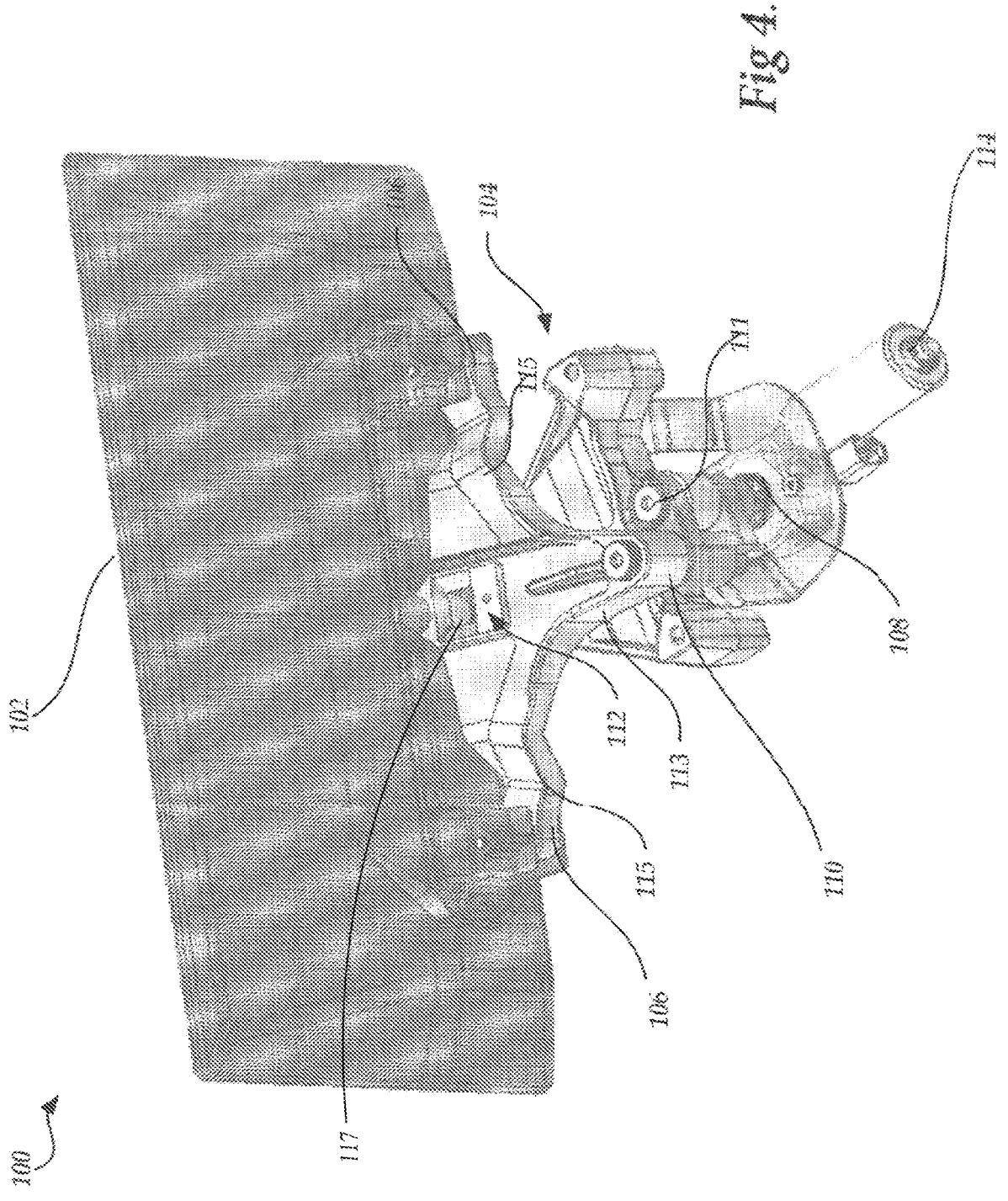
FIG. 4 is a perspective view of a set of components including a display device, rotational mechanism and linkage structure illustrating a second rotational state responsive to a rotational force in accordance with one or more aspects of the present application.

FIGS. 3 and 4 illustrate different rotational states of a rotational mechanism in accordance with various illustrative embodiments. More specifically, FIG. 3 is a perspective view of a set of components including a display device, rotational mechanism and linkage structure illustrating a first rotational state responsive to a rotational force in accordance with one or more aspects of the present application. FIG. 4 is a perspective view of a set of components including a display device, rotational mechanism and linkage structure illustrating a second rotational state responsive to a rotational force in accordance with one or more aspects of the present application. Illustratively, the actuator 114 may be operated a duty cycle and direction of rotation that can incrementally cause a defined rotational force to be applied to the first rotational joint 108 and second rotational joint 110. The rotational force can be discretely defined such that the rotation of the mounting structure 113 can be defined in accordance with defined angular distances. Accordingly, FIG. 3 and FIG. 4 may illustratively define the two endpoints of a range of rotation for the mounting structure 113. Accordingly, various additional rotational states may be included between the two endpoints in accordance with various increments. One skilled in the relevant art will appreciate, however, reference and illustration of the range of rotation is only illustrative in nature and should not be construed as limiting.

Turning now to FIG. 3, a first rotational state of the display device 102 is illustrated based on rotation of the actuator 114 in clockwise rotation. The third rotational joint 112 (e.g., the floating joint) further translates along a third axis defined by the linear channel 117 of the mounting structure 113 to maintain continuity of the translation. FIG. 4 illustrates a second rotational state of the display device 102 based on rotation of the actuator 114 in a counterclockwise rotation. In combination, FIGS. 3 and 4 illustrate that the combination of the first and second rotational joints 108, 110 achieve a range of movement of the display device 102 based on a single actuator rotation. As illustrated in FIGS. 3 and 4, the position of the second rotational joint 110 rotates about a center axis 111 of the first rotational joint 108 from the full range of rotation attributable to the mounting structure 113.

Still further, the third rotational joints 112 allows for movement of the display device in third axis direction defined linear channel 117. As described above, in embodiments in which the display device is integrated in a component of a vehicle, the third joint allows for movement of the display device 102 while maintaining the integration of the display device with the component, such as a portion of the dashboard. In embodiments in which the display device is not integrated into a component of the vehicle (e.g., a free-standing display), the third rotational joint facilitates additional movement of the display device along the third axis.

Figure 5A:
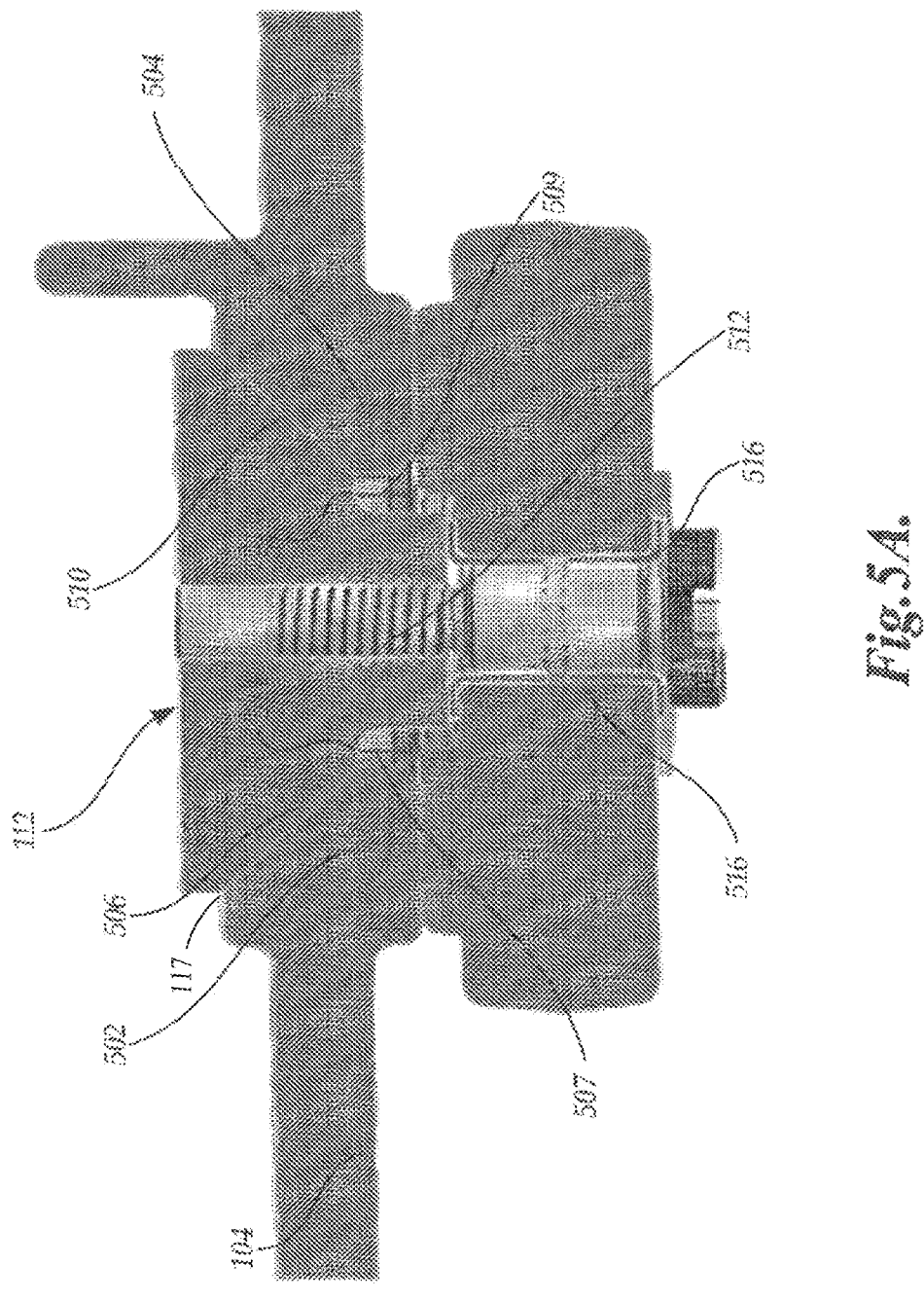
FIGS. 5A-5D are perspective views of a rotational joint and linear channel utilized in a linkage structure in accordance with various embodiments of the present application.

FIGS. 5A-5D illustrate various perspective views of a rotational joint 112 and linear channel 117 utilized in a linkage structure in accordance with various embodiments of the present application. With reference to FIG. 5A, a detailed representation of the third rotational joint 112 and supporting mechanisms is illustrated. As described above, the mounting structure 113 includes a linear channel 117 that includes a set of surfaces that define contact points for the third rotational joint 112. Specifically, the linear channel 117 includes two angular sections 502, 504 that will be complimentary to angular sections 506, 510 of the rotational joint 112. Similarly, the linear channel 117 illustratively includes two horizontal sections 507, 509 that will be complimentary to horizontal sections 511, 513 of the rotational joint 112.

The interface with at least the angular or horizontal surfaces can also include bushings to control friction.

The respective angular sections and horizontal sections create a flush mounting to allow the linkage structure 104 to absorb the forces presented to the rotational joint 112 via the tension mechanism 512, such as a spring. The resulting reaction is that the rotational joint 112 maintains contact with the linkage 104 as the two other rotational joints 108, 110 rotate. Although illustrated with angular sections, the rotational joint could also be implemented in different configurations.

With continued reference to FIG. 5A, the linkage structure 104 can also include bushings 516 between the tension member and the mounting structure 113 to control friction.

Figure 5B:

FIG. 5B illustrates a cross section of the third rotational joint 112 and mounting structure 113. FIG. 5B illustrates the linear channel 117 of the mounting surface 113 that includes a set of surfaces that define contact points for the third rotational joint 112. Specifically, the linear channel 117 includes two angular sections 502, 504 that will be complimentary to angular sections 506, 510 of the third rotational joint 112. Similarly, the linear channel 117 illustratively includes two horizontal sections 507, 509 that will be complimentary to horizontal sections 511, 513 of the rotational joint 112. The interface with at least the angular or horizontal surfaces can also include bushings to control friction.

The linkage structure 104 can also include bushings 516 between the tension member and the mounting structure 113 to control friction. As illustrated in FIG. 5B, the third rotational joint 112 can further include a lock nut 514 for absorbing vibration forces, such as vibration forces created during utilization in vehicle operation.

Figure 5C:
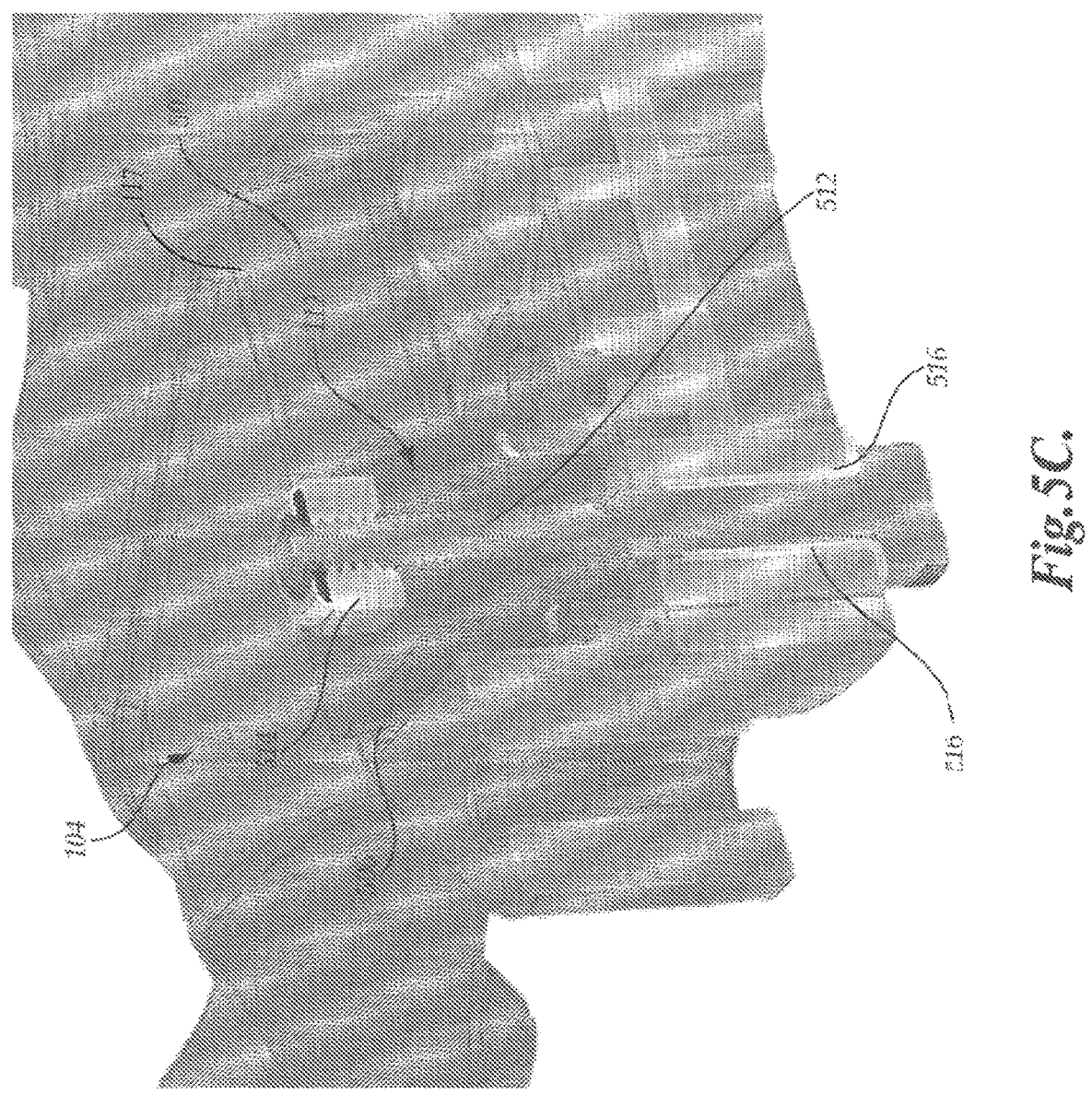

FIG. 5C illustrates a fore aft section of the third rotational joint 112 and mounting structure 113. Similar to FIG. 5A and FIG. B, FIG. 5C illustrates the connection between the third rotational joint 112 within the linear channel 117, including side surface 502 of the mounting structure 113, which abuts the side surface 506 of the third rotational joint. FIG. 5C further illustrates bushings 516 between the tension member and the mounting structure 113 to control friction. The third rotational joint 112 can further include a lock nut 514 for absorbing vibration forces, such as vibration forces created during utilization in vehicle operation.

Figure 5D:
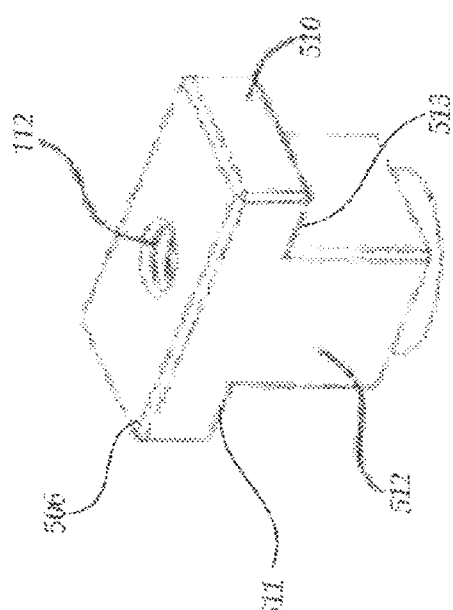
Figure 5D:

FIG. 5D is a perspective view of an alternative embodiment of the third rotational joint 112 in which the side surfaces 506, 510 are not angular but substantially vertical. As also illustrated in FIG. 5D, in this embodiment, the third rotational joint 112 can include horizontal surfaces 511, 513 and the integrated tension member 512. In this embodiment, the third rotational joint 112 would still have the function to similar project movement along the linear channel 117.

Figure 6:
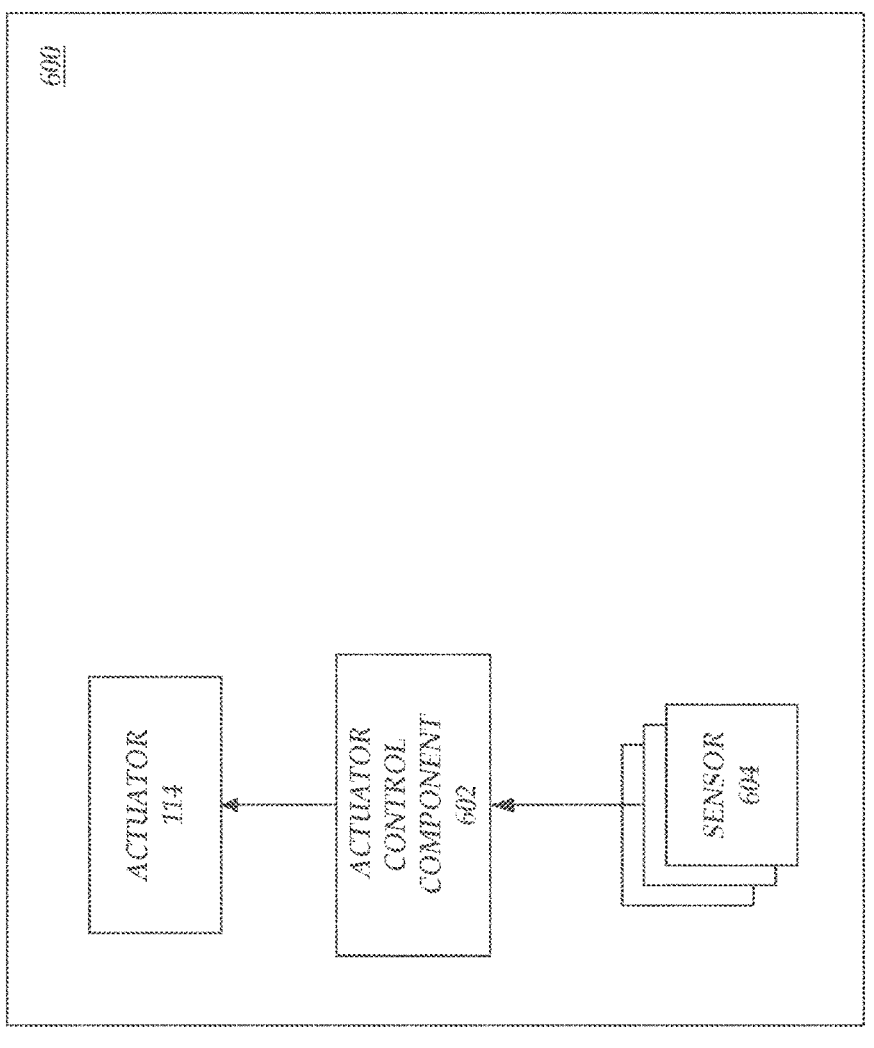
FIG. 6 is a block diagram of a logical representative of various components of a control mechanism for operating a rotational mechanism including a linkage structure in accordance with aspects of the present application.

FIG. 6 is a block diagram of a logical representative of various components of a control mechanism for operating a rotational mechanism including a linkage structure in accordance with aspects of the present application. The sensors/controllers 604 may receive user inputs for determining a desired rotation of a device, such as display device 102. Such examples can include manual inputs audio inputs, etc. The sensors/controllers 604 can detect characteristics of occupants for determining desired rotation. Such attributes can include physical attributes (e.g., height, weight, eye direction, etc.). Such attributes can also include identification of specific users, such as users preconfigured with user profiles. The sensors/controllers 604 can also include preconfigured settings for the rotational angles.

Control components 602 may correspond to any microprocessor-based controller, such a programmable logic controller (PLC) or other controller. The control components 602 can include logic that facilitates the selection of operational parameters for single actuator 114 in terms of rotational direction and duty cycle to achieve the desired rotational position. The control components 602 can also include the transmission of the operational parameters via a control signal or communication protocol.

Illustratively, the control component 602 can utilize a lookup table that can map information from identified sensors to operational parameters of the actuator 114, which results in the rotation of the rotation mechanism 101. In some embodiments, the lookup table can map individual sensor inputs/operational status to the determine operational parameters of the actuator (e.g., rotational angle and duty cycle).

Figure 7:
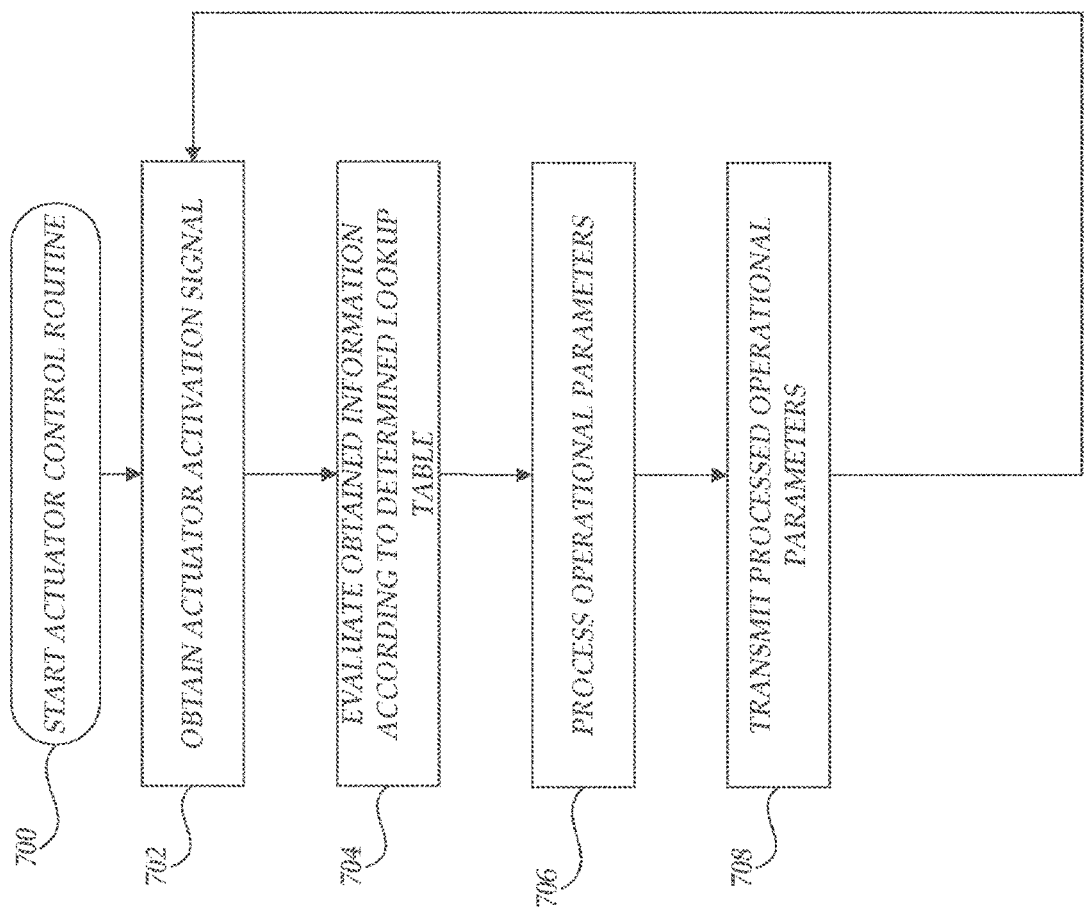
FIG. 7 is a flow diagram illustrative of a routine implemented by the control components for the determination of operational parameters of the actuator for the application of rotational forces to the linkage structure of the rotational mechanism.

FIG. 7 is a flow diagram illustrative of a routine implemented by the control components for the determination of operational parameters of the actuator for the application of rotational forces to the linkage structure 104 of the rotational mechanism. Routine 700 may be implemented for each individual component 602 to determine operational parameters for the actuator 114 and generate control signals corresponding to the determined operational parameters. At block 702, the control component 602 obtains a set of information sources, such as from a plurality of sensors 604, controllers, and the like.

At block 704, the control component 602 determines an appropriate lookup table. In some embodiments, one or more lookup tables utilized by the control component 602 can be specifically configured to individual vehicles. Alternatively, the lookup tables can be common to a set of vehicles, such as by vehicle type, geographic location, user type, and the like. For example, vehicles associated with the northeast region may be configured with a common table while vehicles associated with the south region may be configured with a different, common table. Still further, in other embodiments, a vehicle 100 may be configured with a set of tables that can be applied in accordance with geographic location, user, calendar time, and the like. For example, vehicles may be configured or select different lookup tables during winter months than in summer months or spring months. The lookup tables may be statically configured with the control component, which can be periodically updated. In other embodiments, the lookup tables can be more dynamic in which the frequency of update can facilitated via communication functionality associated with the vehicle. If multiple lookup tables are not provided or the control component is not otherwise configured to process selection criteria, a single lookup table can be automatically retrieved as part of the block 704.

At block 706, the control component 602 can optionally process the identified operational parameters to conduct error checking, threshold comparison, conflict resolutions, normalization, and the like.

At block 708 the control component 602 transmits information or control signals that causes the operation of the actuator in accordance with the selected and processed operational parameters, including the omission of the transmission of control signals. Illustratively, in some embodiments, the control component 602 can further monitor operation of the actuator 114 to monitor for anomalies or other inputs that may be indicative of various non-desired or error conditions. For example, the control component 602 may use vision systems to detect the presence of obstructions in the path of rotation that may be damaged by the display device (or other mounted device) or that may damage the display device or rotational mechanism 101 or other components. In another example, the control component 602 may monitor operational characteristics of the components, such as the actuator 114, that may be indicative of obstructions, failures, etc. Such operational characteristics can include power consumption, timing of rotation, load or force measurements, and the like. Other examples or monitoring approaches may be included in accordance with aspects of the present application. In such scenarios, the control component 602 may terminate the selected rotation, generate notifications, create logs, and the like. Routine 700 returns to block 702 in embodiments for continuous monitoring or can wait for institution of the routine 200.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer those two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A rotation mechanism comprising a linkage structure including:

a mounting structure, the mounting structure including plurality of anchor points, wherein the anchor points are attachable to a component;

a first rotational joint having a center axis and configured to receive rotational input;

a second rotational joint connected to the first rotational joint, wherein the first and second rotational joint are arranged so that rotational forces applied to the first rotational joint are applied to the second rotational joint such that the second rotational joint rotates, at least in part, about the center axis of the first rotational joint;

a linear channel formed within a central axis of the mounting structure, the linear channel having a set of surfaces defining movement along the linear channel; and a third rotational joint making contact with the linear channel based on a tension member, wherein the third rotational joint is a floating joint and is configured to control movement of the rotation mechanism along a linear axis to allow the linkage structure to absorb forces presented to the third rotational joint via the tension member.

2. The rotation mechanism of claim 1 further comprising a lock nut for the third rotational joint for dampening vibration forces.

3. The rotation mechanism of claim 1 further comprising a bushing in between a contact point in the set of surfaces of the linear channel and the third rotational joint.

4. The rotation mechanism of claim 1, where the set of surfaces in the linear channel include a set of horizontal surfaces for contacting corresponding horizontal surfaces provided by the third rotational joint.

5. The rotation mechanism of claim 1, where the set of surfaces in the linear channel include a set of angular surfaces for contacting corresponding angular surfaces provided by the third rotational joint.

6. The rotation mechanism of claim 1, wherein the mounting structure includes a set of arms for locating the anchor points opposing a central axis of the mounting structure.

7. The rotation mechanism of claim 1, wherein the tension member is a spring.

8. The rotation mechanism of claim 1 further comprising a control unit for providing control instructions to a single actuator connected to the first rotational joint.

9. A rotation mechanism comprising a linkage structure including:

a mounting structure, the mounting structure including plurality of anchor points, wherein the anchor points are attachable to a component;

a first rotational joint having a center axis and configured to receive rotational input from a single actuator;

a second rotational joint connected to the first rotational joint, wherein the first and second rotational joint are arranged so that rotational forces applied to the first rotational joint are applied to the second rotational joint such that the second rotational joint rotates, at least in part, about the center axis of the first rotational joint;

a third rotational joint, wherein the third rotational joint is a floating joint and is configured to control movement of the rotation mechanism along a linear axis to allow the linkage structure to absorb forces presented to the third rotational joint via a tension member; and a linear channel formed within a central axis of the mounting structure, the linear channel having a set of horizontal surfaces for contacting corresponding horizontal surfaces provided by the third rotational joint and a set of angular surfaces for contacting corresponding angular surfaces provided by the third rotational joint.

10. The rotation mechanism of claim 9 further comprising a lock nut for the third rotational joint for dampening vibration forces.

11. The rotation mechanism of claim 9 further comprising a bushing in between a contact point in the set of surfaces of the linear channel and the third rotational joint.

12. The rotation mechanism of claim 9, wherein the mounting structure includes a set of arms for locating the anchor points opposing a central axis of the mounting structure.

13. The rotation mechanism of claim 9, wherein the tension member is a spring.

14. The rotation mechanism of claim 9 further comprising a control unit for providing control instructions to the single actuator, wherein the single actuator is connected to the first rotational joint.

15. The rotation mechanism of claim 9 further comprising a bushing between the third rotational joint and the mounting structure.

16. A rotation mechanism comprising a linkage structure including:

a mounting structure, the mounting structure including plurality of anchor points, wherein the anchor points are attachable to a component;

a first rotational joint having a center axis and configured to receive rotational input;

a second rotational joint connected to the first rotational joint, wherein the first and second rotational joints are arranged so that rotational forces applied to the first rotational joint are applied to the second rotational joint such that the second rotational joint rotates, at least in part, about the center axis of the first rotational joint;

a linear channel formed within a central axis of the mounting structure, the linear channel having a set of surfaces defining movement along the linear channel; and a third rotational joint making contact with the linear channel based on a tension member, wherein the third rotational joint is a floating joint configured to translate along a linear axis defined by the linear channel to absorb forces presented to the third rotational joint via the tension member.

* * * * *